United States Patent
Chen

(10) Patent No.: US 9,628,742 B2
(45) Date of Patent: Apr. 18, 2017

(54) FREQUENCY PREDICTION METHOD AND IMAGE PROCESSING DEVICE APPLYING THE SAME

(71) Applicant: MStar Semiconductor, Inc., Hsinchu Hsien (TW)

(72) Inventor: Yuh-Kuang Chen, Zhubei (TW)

(73) Assignee: MSTAR SEMICONDUCTOR, INC., Hsinchu Hsien (TW)

(*) Notice: Subject to any disclaimer, the term of this patent is extended or adjusted under 35 U.S.C. 154(b) by 0 days.

(21) Appl. No.: 15/245,760

(22) Filed: Aug. 24, 2016

(65) Prior Publication Data

US 2017/0070697 A1 Mar. 9, 2017

(30) Foreign Application Priority Data

Sep. 4, 2015 (TW) .............................. 104129327 A

(51) Int. Cl.
*H04N 5/50* (2006.01)
*H04N 5/44* (2011.01)

(52) U.S. Cl.
CPC ... *H04N 5/4403* (2013.01); *H04N 2005/4444* (2013.01)

(58) Field of Classification Search
CPC ...... H04N 5/44; H04N 5/4403; H04N 5/4401; H04N 5/50; H04N 2005/4444; H04N 21/4384; H04N 21/4383
USPC .............................. 348/725, 731–733; 725/38

IPC ................................................ H04N 5/44,5/50
See application file for complete search history.

(56) References Cited

U.S. PATENT DOCUMENTS

| | | | |
|---|---|---|---|
| 2002/0067438 A1* | 6/2002 | Baldock | H04N 5/50 348/731 |
| 2010/0251296 A1* | 9/2010 | Kim | H04N 5/50 725/38 |

FOREIGN PATENT DOCUMENTS

| | | |
|---|---|---|
| CN | 101422036 | 4/2009 |
| CN | 101682727 | 3/2010 |
| TW | 201401856 | 1/2014 |

* cited by examiner

*Primary Examiner* — Sherrie Hsia
(74) *Attorney, Agent, or Firm* — WPAT, PC; Justin King

(57) ABSTRACT

A frequency prediction method for determining a plurality of predicted frequencies for an image processing device to receive an image signal is provided. The frequency prediction method includes: receiving a channel switching signal; determining a plurality of prediction results according to the channel switching signal, wherein the prediction results have a priority sequence; and determining the predicted frequencies according to the prediction results and a channel-frequency correspondence table.

16 Claims, 5 Drawing Sheets

FREQUENCY PREDICTION METHOD AND IMAGE PROCESSING DEVICE APPLYING THE SAME

This application claims the benefit of Taiwan application Serial No. 104129327, filed Sep. 4, 2015, the subject matter of which is incorporated herein by reference.

BACKGROUND OF THE INVENTION

Field of the Invention

The invention relates in general to frequency switching and prediction, and more particularly to a frequency prediction method and an image processing device applying the method.

Description of the Related Art

To provide better viewing experiences, many image processing devices (e.g., a television and a set-top box) adopt numerous tuners to pre-process a channel that is likely selected next. Therefore, accurately predicting a next channel likely selected by a user is a critical mechanism in such image processing device.

SUMMARY OF THE INVENTION

It is an object of the present invention to provide a frequency prediction method and an image processing device applying the method to provide accurate frequencies or frequency prediction.

The present invention provides a frequency prediction method for determining a plurality of predicted frequencies for an image processing device to receive an image signal. The frequency prediction method includes: receiving a channel switching signal; determining a plurality of prediction results according to the channel switching signal, wherein the prediction results have a priority sequence; and determining the predicted frequencies according to the prediction results and a channel-frequency correspondence table.

The present invention further discloses an image processing device adapted to determine a plurality of predicted frequencies and accordingly receive an image signal. The image playback device includes: a memory, storing a channel-frequency correspondence table; a receiver, receiving a channel switching signal; a frequency determining module, determining a plurality of prediction results according to the channel switching signal, and determining the predicted frequencies according to the prediction results and the channel-frequency correspondence table, wherein the prediction results have a priority sequence; and a plurality of tuners, receiving the image signal according to the predicted frequencies.

The present invention further discloses a method for updating a channel selection record. The method is applied to an image processing device, which determines a plurality of predicted frequencies according to the channel selection record and accordingly receives an image signal. The channel selection record records a first channel switching signal, a second channel switching signal and a counter value. The method includes: when the image processing device switches from a previous channel to a first channel according to the first channel switching signal and switches from the first channel to a second channel according to the second channel switching signal, and the first channel switching signal corresponds to channel number information of the first channel, updating the counter value.

The frequency prediction method and the image processing device applying the method of the present invention are capable of providing accurate frequencies or channel prediction to enhance user viewing experiences. Compared to known technologies, the present invention provides different prediction mechanisms according to types of channel switching signals, hence obtaining more accurate prediction results.

The above and other aspects of the invention will become better understood with regard to the following detailed description of the preferred but non-limiting embodiments. The following description is made with reference to the accompanying drawings.

DETAILED DESCRIPTION OF THE INVENTION

The disclosure of the application includes a frequency prediction method and an image processing device applying the method. In possible implementation, one skilled person in the art may choose equivalent elements or steps to implement the disclosure based on the disclosure of the application. That is, the implementation of the disclosure is not limited by the embodiments disclosed in the disclosure.

Figure 1:
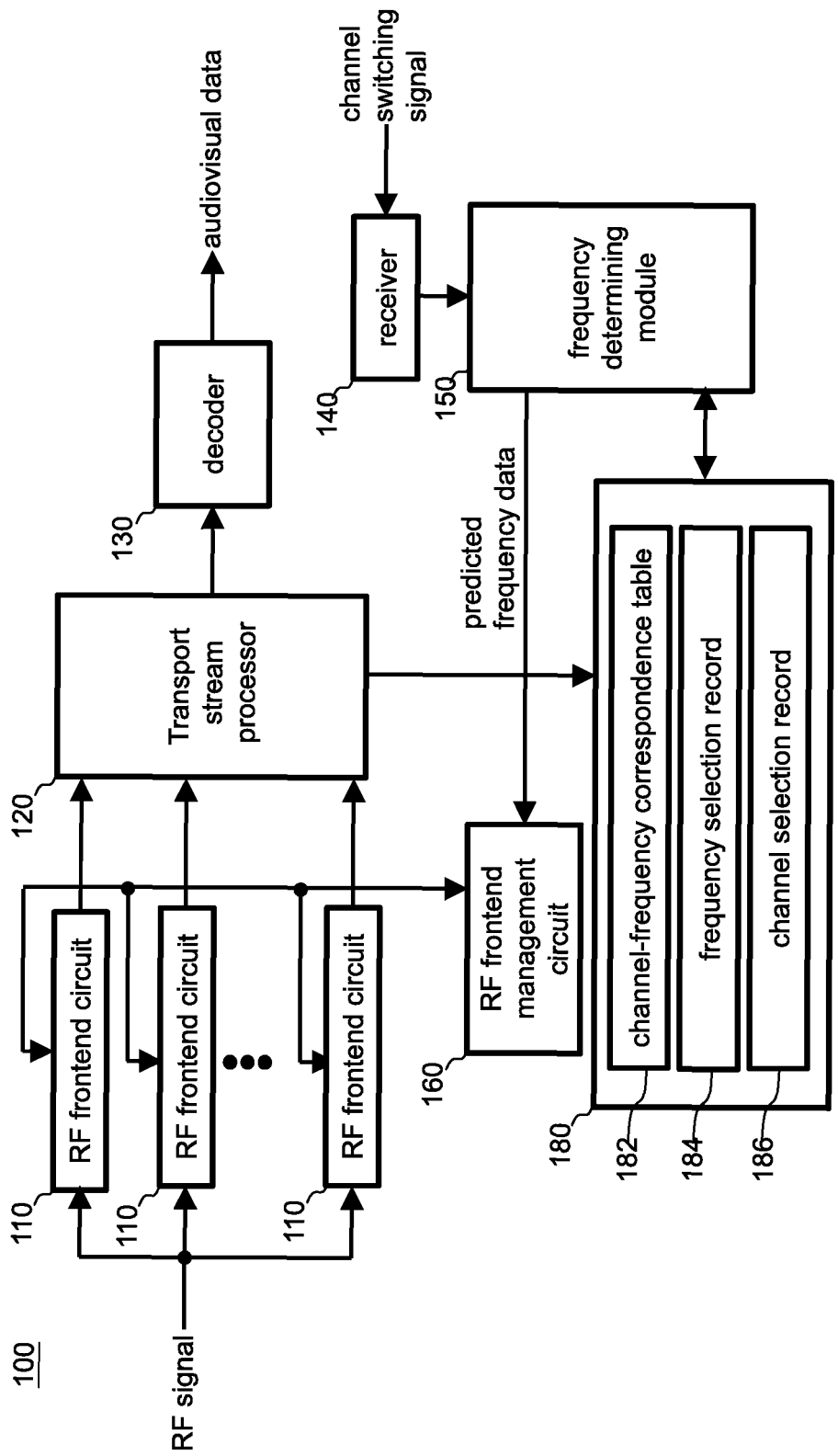
FIG. 1 is a function block diagram of an image processing device of the present invention.

FIG. 1 shows a function block diagram of an image processing device of the present invention. Referring to FIG. 1, radio-frequency (RF) frontend circuits 110 receives RF signals. Each of the RF frontend circuits 110 down-converts the RF signal from a radio frequency to an intermediate frequency and from a digital format to an analog format using an internal tuner and demodulator. A transport stream processor 120 filters and obtains associated packets from the digital signals that the RF frontend circuits 110 generate. Video and audio decoding is then performed by a decoder 130 to generate final audiovisual data. The transport stream processor 120 further generates channel information that is then stored in a memory 180. On the other hand, a receiver 140 receives a channel switching signal (e.g., issued from a remote controller) from outside the image processing device 100 (e.g., applied to a television or a set-top box), and triggers a frequency determining module 150. The frequency determining module 150 is built-in with a frequency predicting algorithm, which may be stored in a memory (which may be a same or different physical memory from the memory 180) in form of a program code. In one embodiment, the frequency determining module 150 may be a central processor or a calculation unit, which executes the program code and refers to data in the memory 180 to obtain predicted frequency data. An RF frontend management circuit 160 then controls the RF frontend circuits 110 to select frequencies according to the predicted frequency data. The term "frequency" refers to the frequency of a transport stream.

Figure 2A:
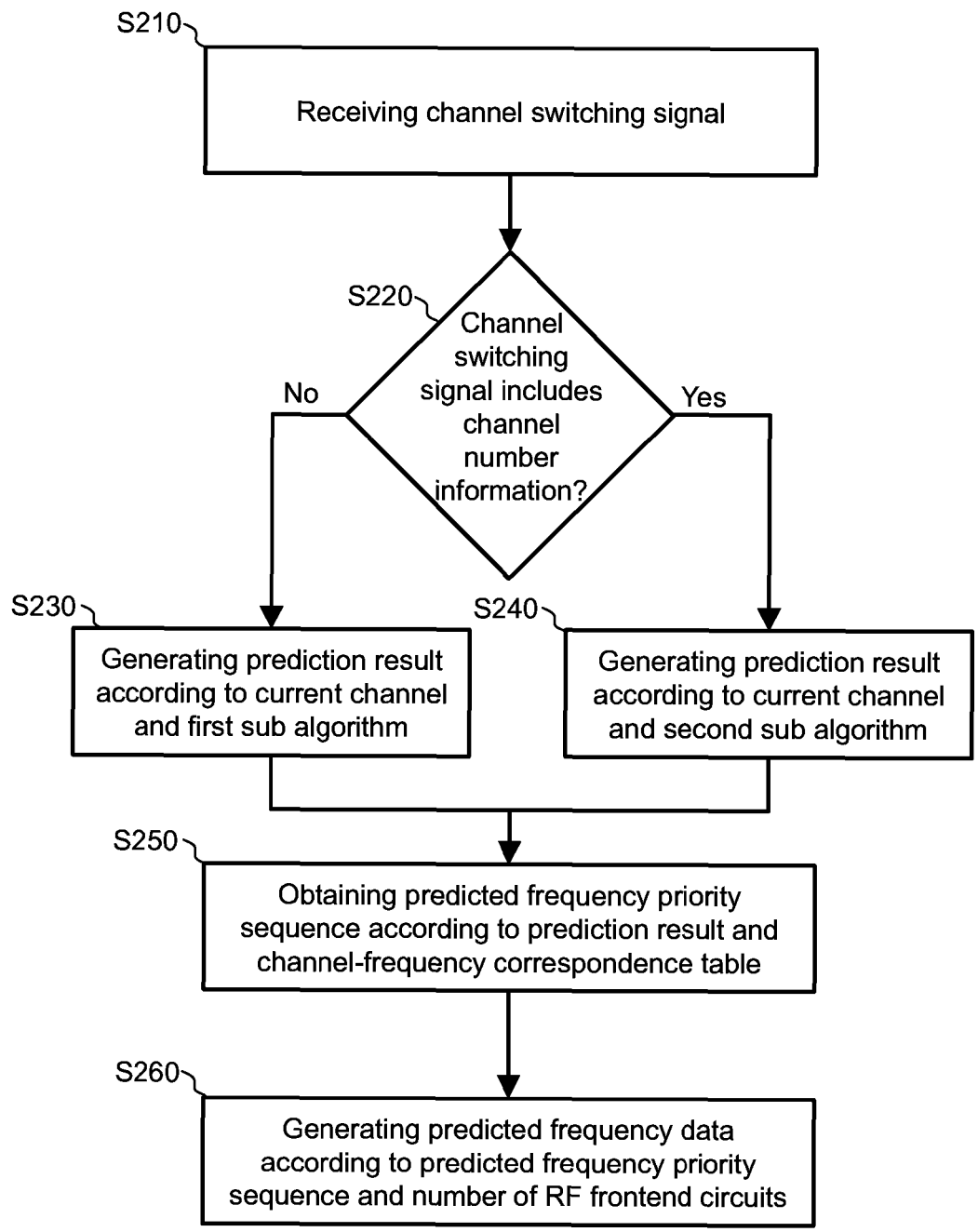
FIGS. 2a to 2d are flowcharts of frequency prediction algorithms of the present invention.

FIG. 2a shows a flowchart of a frequency predicting algorithm. When the frequency determining module 150 receives the channel switching signal (step S210), it first determines whether the channel switching signal is triggered by a numerical key or an equivalent button on a remote controller, i.e., determining whether the channel switching signal carries channel number information (step S220). If not, a prediction result is generated according to a currently playing channel and a first sub algorithm (step S230); if so, a prediction result is generated according to the currently playing channel and a second sub algorithm (step S240). A predicted frequency priority sequence is then obtained according to the prediction results and a channel-frequency correspondence table 182 (step S250). According to the predicted frequency priority sequence and the number of the RF frontend circuits 110 (i.e., the number of tuners), predicted frequency data is generated (step S260).

Figure 2B:
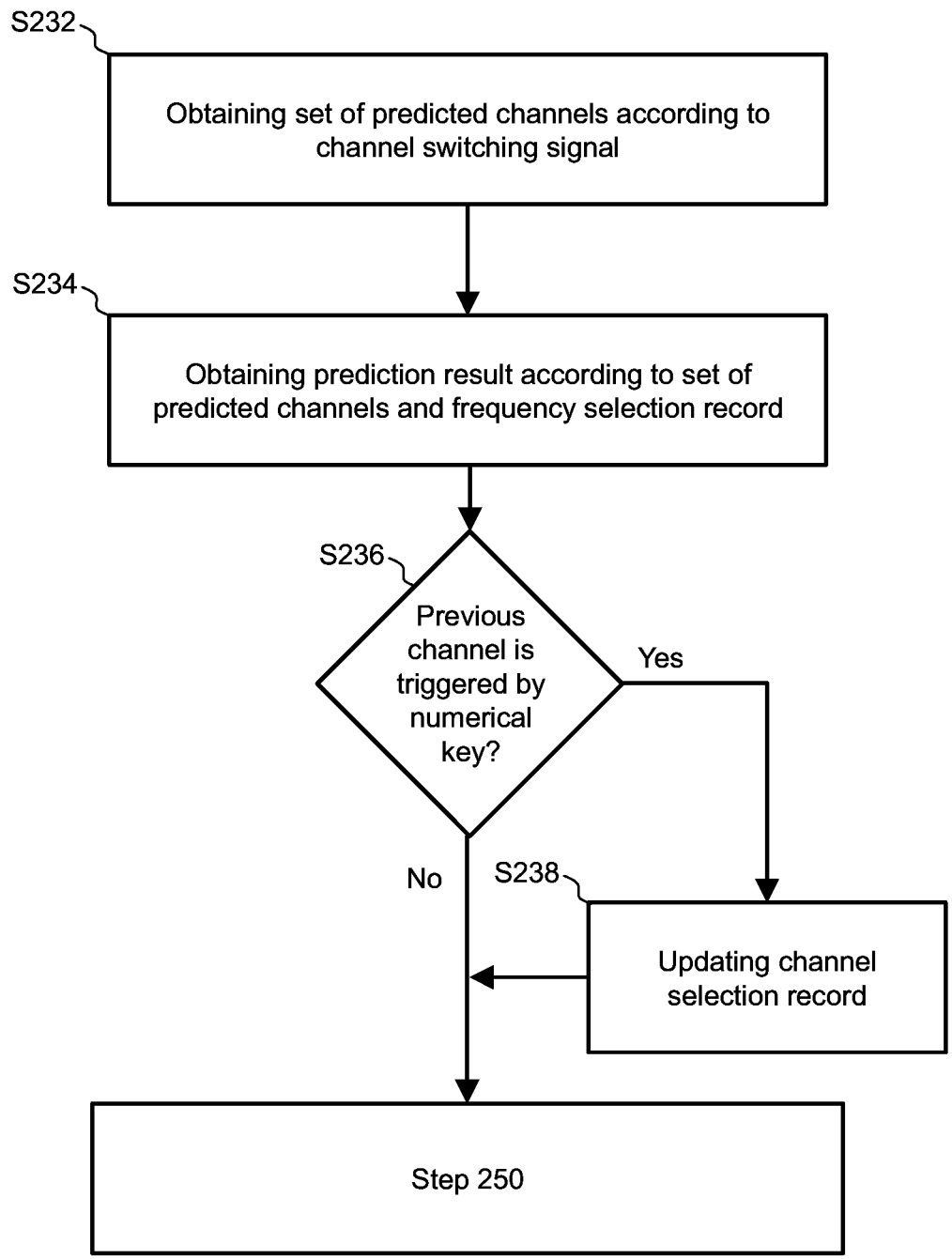

FIG. 2b shows a detailed flowchart of the first sub algorithm. In addition to numerical keys, common channel switching keys of a general remote controller include an up key (or an equivalent key such as "+", increasing the current channel number by 1), a down key (or an equivalent key such as "-", decreasing the current channel number by 1), and a return key (returning to the previously watched channel). The channel switching keys respectively correspond to different channel switching signals. The image processing device 100 immediately performs a channel switching event according to the channel switching signals triggered by the up key, the down key and the return key. In contrast, a channel switching signal triggered by a numerical key needs to satisfy a predetermined condition (with associated details to be described shortly) for a channel switching event to take place. In the first sub algorithm, a set of predicted channels are obtained according to the channel switching signal (step S232). In one embodiment, the predicted channels respectively corresponding to the up key, the down key and the return key may be: {cur, up, down, ret}, (cur, down, up, ret} and (cur, ret, up, down}, where cur represents the currently watched channel (e.g., channel 151), up represents a next channel (e.g., channel 152), down represents a previous channel of cur (e.g., channel 150), and ret represents a previously watched channel (e.g., assuming that the previous channel switching is triggered by the up key, ret then represents channel 150). Among the predicted channels, a channel has a higher priority as it gets closer to the left. More specifically, taking the predicted channels ({cur, down, up, ret}) of the down key for instance, cur is the newly switched channel, and naturally has the highest priority; the sequence of down, up and ret indicates that, after the user currently presses the down key, most likely pressed keys are sequentially the down key, the up key and then the return key. Thus, the above priority sequence prepares in advance the channels that the user subsequently likely selects.

After the predicted channels are obtained, a frequency selection record 184 is referred to obtain prediction results (step S234). The frequency selection record 184 includes the number of times a frequency having been selected by numerical keys, and is stored in the memory 180 in a form below, for example.

| Frequency selection record | |
|---|---|
| Frequency | Number of times of selection |
| C | 10 |
| A | 8 |
| B | 6 |
| D | 2 |

The frequency represents the frequency of one transport stream, and multiple channels may correspond to the same frequency. The frequency selection record 184 is updated each time the user switches channel through the numerical keys; that is, the number of times of selection of the frequency corresponding to the selected channel is increased by 1. The format of a prediction result is as: {predicted channel, frequency selection record}. Thus, for the above example, the prediction results obtained after pressing the up key are {151, 152, 150, 150, C, A, B, D}, wherein in the prediction results, the frequencies are sequentially arranged according to the number of times of having been selected recorded in the selection record 184. Similarly, a prediction result has a higher priority as it gets closer to the left. In the subsequent S236, it is determined whether the previous channel switching is triggered by a numerical key, i.e., determining whether the channel switching signal corresponding to the previous channel switching includes channel number information, so as to further determine whether to proceed to step S238. It is assumed that the determination result of step S236 is negative, and steps S236 and S238 are to be described in detail shortly.

Again referring to FIG. 2a, in step S250, a predicted frequency priority sequence is obtained according to the prediction results and the channel-frequency correspondence table 182. The channel-frequency correspondence table 182 records the correspondence between channels and frequencies, and is stored in the memory 180 in a form as the table below:

| Channel-frequency correspondence table | | | |
|---|---|---|---|
| Frequency | Channel | Frequency | Channel |
| A | 150 | | ... |
| A | 151 | C | 170 |
| B | 152 | C | 171 |
| B | 153 | D | 172 |
| B | 154 | D | 173 |
| B | 155 | | ... |

After referring to the channel-frequency correspondence table 182, the above prediction results {151, 152, 150, 150, C, A, B, D} may be converted to a predicted frequency priority sequence {A, B, A, A, C, A, B, D}. In step S260, non-overlapping frequencies in a number equal to that number of the RF frontend circuits 110 are selected from the predicted frequency priority sequence {A, B, A, A, C, A, B, D} as the predicted frequency data. During the selection, non-overlapping frequencies are selected from the predicted frequencies from the left to the right (i.e., from a high priority to a low priority), till the number of frequencies in the predicted frequency data is equal to the number of the RF frontend circuit 110, or till all of the frequencies in the predicted frequency priority sequence are selected. Assuming that there are three RF frontend circuits 11, the final predicted frequency data obtained is {A, B, C}; assuming that there are four RF frontend circuits 110, the final predicted frequency data obtained is {A, B, C, D}. The order of the frequencies in the predicted frequency data need not be specifically arranged, given that each of the frequencies is processed by a corresponding RF frontend circuit 110.

Figure 2C:
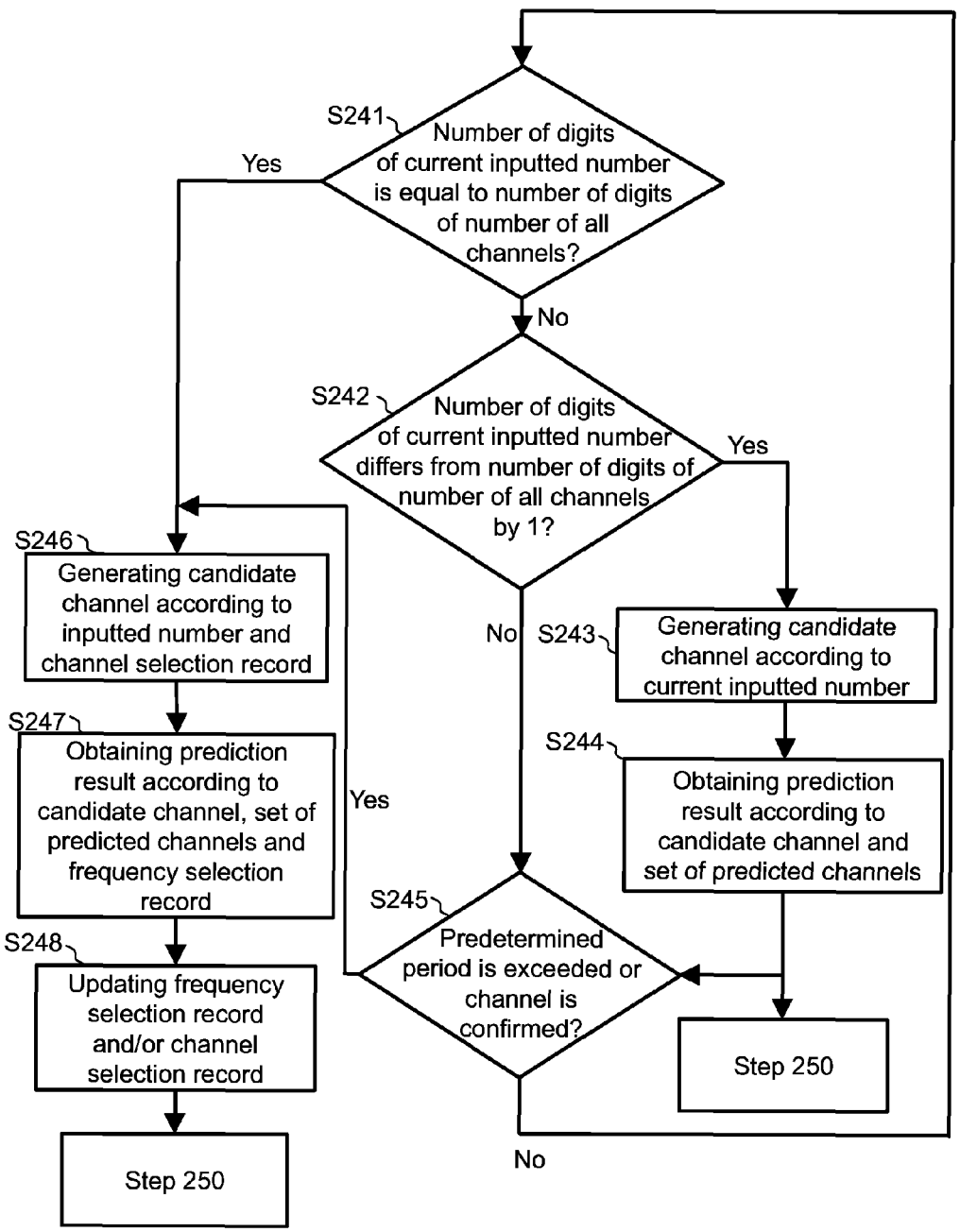

FIG. 2c shows a detailed flowchart of a second sub algorithm according to an embodiment of the present invention. When the channel switching signal carries channel number information, it is further determined whether the number of current inputted number is equal to the number of digits of the number of all the channels (step S241). For example, if there are a total of 99 channels available for viewing, the number of digits of the number of all the channels is 2-digit; if there are 999 channels, the number of digits of the number of all the channels is 3-digit. Taking 3-digit for example, the input sequence of the digits of a number inputted through numerical keys by the user for switching the channel is hundreds→tens→ones. In continuation of the foregoing example, assume that the user switches from channel 150 to 151, and then wishes to again switch to a target channel 171. For the first entry of the user (pressing the numerical key 1), the number of digits of the current inputted number is (1), which is not equal to the number of digits (3) of the number of all the channels, and so the determination result of step S241 is negative. In step S242, it is determined whether the number of digits of the current inputted number differs the number of digits of the number of all the channels by 1. More specifically, this step determines whether the current entry of the user is the tens digit of the channels. In this example, the number of digits of the current inputted number (1) differs the number of digits (3) of the number of all of the channels by 2, and so step S245 is performed.

In step S245, it is determined whether a period till a next entry is too long (e.g., a predetermined period is reached), or the user has confirmed the inputted channel. When the determination result of step S245 is affirmative, it means that a channel switching event has taken place. For example, if a period waited after the user presses the numerical key 1 is too long or the user presses any confirm key after presses the numerical key 1, the channel 1 is determined to the target channel, and the currently playing channel is immediately switched to channel 1. Step S246 is performed when the target channel is confirmed, or else step S241 is iterated. It is assumed that the user presses the numerical key 7 within the predetermined period, the determination result of step S241 is still negative (the number of digits of the number inputted is 2), and so step S242 is performed. At this point, the determination result of step S242 is affirmative, and so step S243 is performed. In step S243, a candidate channel is generated according to the current inputted number. The candidate channel is a possible channel associated with the current inputted number or numbers. For example, for an inputted number 17, there are a total of 11 possible channels, including channels 17 and 170 to 179. Next, the candidate channel is combined with a set of predetermined channels to generate a prediction result (step S244). For example, the predicted channels are {cur, up, down, ret}, and the prediction result may then be {cur, predicted channel, up, down, ret}. Taking actual numbers for illustrations, in continuation of the above example (the original channel is channel 151), a prediction result {151, 17, 170~179, 152, 150, 150} is obtained, with the ones closer to the left having a higher priority. It should be noted that, channel switching has not yet taken place at this point, and so parameters cur, up, down and ret in the prediction result still regard the currently playing channel (i.e., channel 151) as the reference target. After step S244 is complete, while steps S250 and S260 in FIG. 2a are iterated to generate the predicted frequency data to allow the RF frontend management circuit 160 to perform preparations for accordingly changing the frequencies of the RF frontend circuits 110, step S245 in the process in FIG. 2c is continued.

If the user at this point completes inputting the ones digit of channel 171, the determination result of step S241 is affirmative, and step S246 is performed, i.e., the candidate channel is generated according to the inputted number and the channel selection record 186. For example, the table below is a part of the information possibly recorded in the channel selection record 186:

| Channel selection record | | |
| --- | --- | --- |
| Channel | Next action | Number of times |
| 17 | up | 9 |
|  | down | 15 |
|  | Switching to channel 137 | 3 |
| 151 | down | 7 |
|  | Switching to channel 171 | 6 |
| 171 | up | 12 |
|  | Switching to channel 55 | 7 |

According to statistics, after a user switches to one channel using numerical keys, it is highly likely that the user continues browsing channels near the newly switched channel using the up key and the down key. As the same type of channels are mostly arranged together, when a user wishes to watch that type of programs (e.g., movies), a user is prone to first switch to one of these channels and then continue browsing the contents of all of the channels of the same type by pressing the up key and the down key. Thus, according to the channel selection record 186, the channel that is next to be switched by the user can be more accurately predicted. In continuation of the above example, a next possible action corresponding to the current channel 171 (channel switching has taken place after the ones digit is inputted) is: pressing the up key (12 times) and inputting 55 (7 times), and so channels 172 and 55 may be identified as the candidate channels. Alternatively, only one with the number of times exceeding a predetermined threshold may be selected, e.g., channel 172 is selected when the threshold is 10.

According to the candidate channel(s), one set of predicted channels and the frequency selection record 184, a prediction result is obtained (step S247). The predicted channel may be {cur, down, up, ret}, and the prediction result may be {cur, candidate channel, down, up, ret, frequency selection record}. Taking actual numbers for illustrations, in continuation of the above example, the prediction result {171, 172, 55, 170, 172, 151, C, A, B, D} is obtained. It should be noted that, the parameters cur, down, up and ret in the prediction result still regard the currently playing channel as the reference. However, as channel switching has taken place at this point, the parameters cur, down, up and ret in the prediction result regard the newly switched channel (i.e., channel 171) as the reference. The frequency selection record 184 and/or the channel selection record 186 are/is updated according to the newly switched channel (step S248). According to the channel-frequency correspondence table 182, the newly switched channel 171 corresponds to the frequency C, and so the number of times of selection of the frequency C in the updated frequency selection record 184 becomes 11, while the remaining part stays unchanged. Further, if the channel before switching (i.e., channel 151) is directly selected through numerical keys, this step needs to further update the channel selection record 186, i.e., changing the number of times corresponding to channel "151" and a next action "switching to channel 171" from 6 times to 7 times. After step S248 is complete, step S250 in FIG. 2a is performed. However, in step S245 (17 is already inputted), if the predetermined period is exceeded or the channel is confirmed, channels 18, 16 and 137 are obtained as the candidate channels in step S246 according to the channel selection record 186.

Figure 2D:
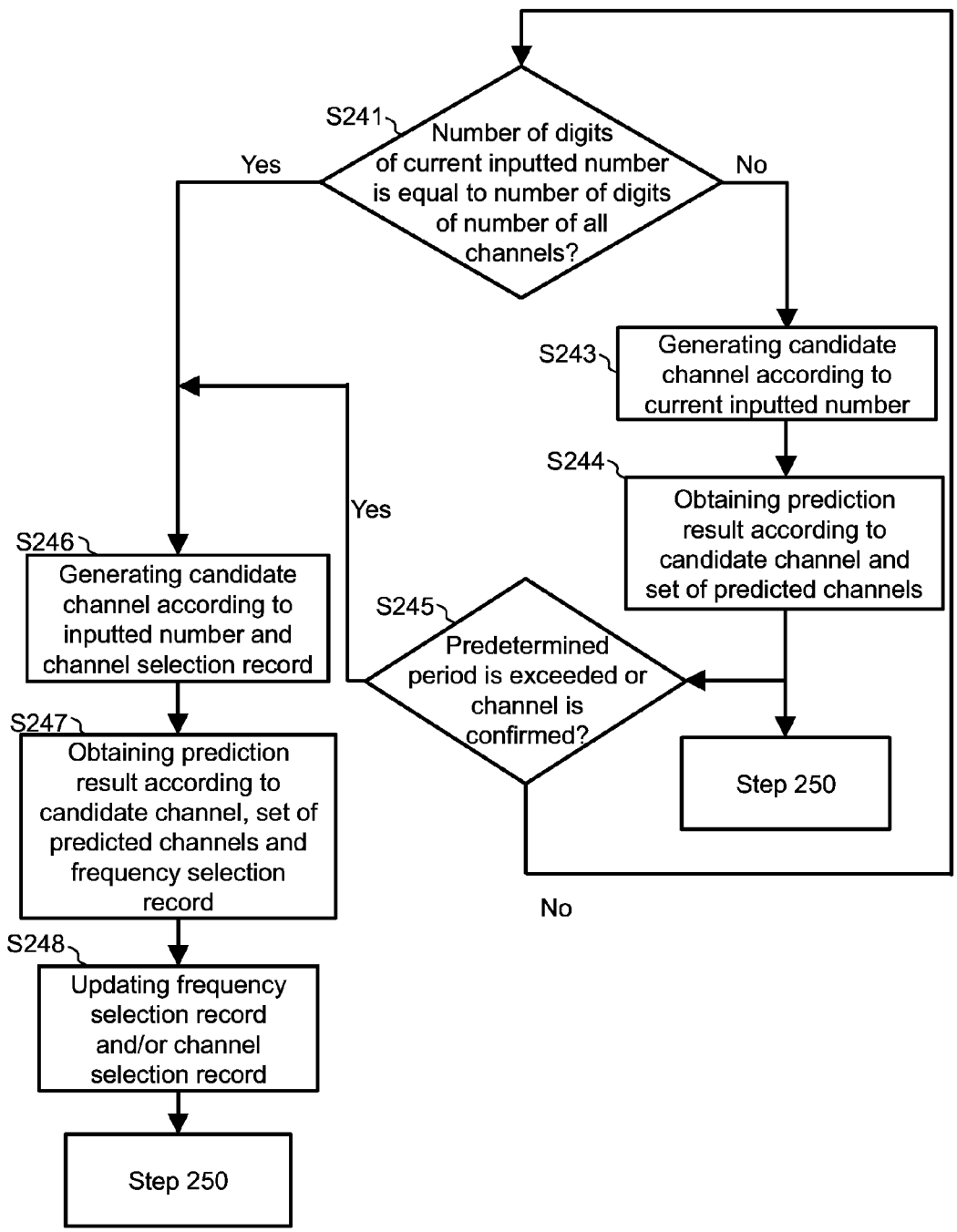

FIG. 2d shows a detailed flowchart of a second sub algorithm according to another embodiment. When the number of digits of the current inputted number has not reached the number of digits of the number of all the channels (step S241), the candidate channel is generated according to the current inputted channel (step S243). For example, when the hundreds digit of the channel 171 as the target channel is inputted, step S243 generates a total of 11 channels, including channels 1 and 10 to 19, according to the current inputted number (1), or a total of 111 channels, including channels 1, 10 to 19 and 100 to 199. Details of the subsequent process are identical to the embodiment in FIG. 2c, and shall be omitted herein. When step S243 is performed for the second time (the current inputted number is 17), a total of 11 channels, including channels 17 and 170 to 179, are generated as the candidate channels. One difference between the processes in FIG. 2c and FIG. 2d is the different timings at which the candidate channels are generated.

Assuming that the user switches from channel 151 to channel 171, and continues pressing the up key to watch channel 172, the process in FIG. 2b is iterated. At this point, the determination result of step S236 is affirmative, and so step S238 is performed, i.e., the number of times of corresponding to channel "171" and a next action "up" is changed from 12 times to 13 times. Step S250 is then performed.

It should be noted that, the difference in the number of digits in step S242 may be set to other values, e.g., 2. As such, when the hundreds digit of 171 is inputted, step S243 generates a total of 111 candidate channels, including channels 1, 10 to 19 and 100 to 199. Further, only a part of the channels instead of all of the channels may be applied in the present invention, e.g., prediction is performed based on "favorite list" of the user. Alternatively, according to attributes of channels, the channels of the same type as the channel currently being watched are added to the candidate channels. The attributes of the channels may be learned from the electronic program guide (EPG). Further, the present invention may predict according to time. For example, assuming that a user often watches channel 155 at 19:00, the frequency determining module 150 of the present invention may initiatively determine the prediction result according to the viewing habit of the user when that time approaches. Given the device (e.g., a smart television) applying the image processing device 100 is capable of obtaining user information, the present invention may also establish different frequency selection records 184 and channel selection records 186 corresponding to different users. The above channel selection record 186 may further include more history information to increase the prediction accuracy. For example, the channel selection record 186 is changed to the format of the table below:

| Channel selection record | | | |
|---|---|---|---|
| Previous channel | Channel | Next action | Number of times |
| 165 | 17 | up | 9 |
|  |  | down | 15 |
|  |  | Switching to channel 137 | 3 |
| 155 | 151 | down | 7 |
|  |  | Switching to channel 171 | 6 |
| 36 | 171 | up | 12 |
|  |  | Switching to channel 55 | 7 |

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A frequency prediction method, for determining a plurality of predicted frequencies for an image processing device to receive an image signal, comprising:
    receiving a channel switching signal;
    determining a plurality of prediction results according to the channel switching signal, wherein the prediction results have a priority sequence; and
    determining the predicted frequencies according to the prediction results and a channel-frequency correspondence table.

2. The frequency prediction method according to claim 1, wherein the step of determining the prediction results according to the channel switching signal comprises:
    determining a plurality of predicted channels according to a currently playing channel and the channel switching signal; and
    determining the prediction results according to the predicted channels and the channel switching signal.

3. The frequency prediction method according to claim 1, wherein the step of determining the prediction results according to the channel switching signal comprises:
    if the channel switching signal comprises channel number information, determining a plurality of candidate channels according to the channel number information, wherein a higher digit of channel numbers of the candidate channels corresponds to the channel number information; and
    determining the prediction results according to the candidate channels and the channel switching signal.

4. The frequency prediction method according to claim 1, wherein the step of determining the prediction results according to the channel switching signal comprises:
    if the channel switching signal comprises a plurality of sets of channel number information and the number of the sets of channel number information reaches a predetermined value, determining a plurality of candidate channels according to the sets of channel number information, wherein a higher digit of channel numbers of the candidate channels corresponds to the sets of channel number information; and
    determining the prediction results according to the candidate channels and the channel switching signal.

5. The frequency prediction method according to claim 1, wherein the step of determining the prediction results according to the channel switching signal comprises:
    if the channel switching signal comprises channel number information, determining a candidate channel according to the channel number information and a channel selection record, wherein the channel selection record records the channel switching signal, another channel switching signal and a counter value, and the counter value corresponds to the number of times that the image processing device receives the another channel switching signal after receiving the channel switch signal; and
    determining the prediction results according to the candidate channel and the channel switching signal.

6. The frequency prediction method according to claim 1, wherein the step of determining the prediction results according to the channel switching signal comprises:
    determining a candidate frequency according to a frequency selection record that records the number of times that the frequency is selected; and determining the prediction results according to the candidate frequency and the channel switching signal.

7. The frequency prediction method according to claim 6, wherein the step of determining the prediction results according to the channel switching signal further comprises:
   determining a plurality of predicted channels according to a currently playing channel; and
   determining the prediction results according to the predicted channels, wherein a priority of the frequencies corresponding to the predicted channels are higher than that of the candidate frequency.

8. The frequency prediction method according to claim 1, the image processing device comprising a plurality of tuners, the method further comprising:
   selecting the predicted frequencies such that the number of the selected predicted frequencies is not greater than the number of the tuners;
   wherein, the tuners receive the image signal according to the selected predicted frequencies.

9. An image processing device, adapted to determine a plurality of frequencies and accordingly receive an image signal, comprising:
   a memory, storing a channel-frequency correspondence table;
   a receiver, receiving a channel switching signal;
   a frequency determining module, determining a plurality of prediction results according to the channel switching signal, and determining the predicted frequencies according to the prediction results and the channel-frequency correspondence table, wherein the prediction results have a priority sequence; and
   a plurality of tuners, receiving the image signal according to the predicted frequencies.

10. The image processing device according to claim 9, wherein the frequency determining module determines a plurality of predicted channels according to a currently playing channel and the channel switching signal, and determines the prediction results according to the predicted channels and the channel switching signal.

11. The image processing device according to claim 9, wherein if the channel switching signal comprises channel number information, the frequency determining module determines a plurality of candidate channels according to the channel number information, a higher digit of channel numbers of the candidate channels corresponds to the channel number information, and the frequency determining module determines the prediction results according to the candidate channels and the channel switching signal.

12. The image processing device according to claim 9, wherein if the channel switching signal comprises a plurality of sets of channel number information and the number of the sets of channel number information reaches a predetermined value, the frequency determining module determines a plurality of candidate channels according to the sets of channel number information, a higher digit of channel numbers of the candidate channels corresponds to the sets of channel number information, and the frequency determining module determines the prediction results according to the candidate channels and the channel switching signal.

13. The image processing device according to claim 9, wherein if the channel switching signal comprises channel number information, the frequency determining module determines a candidate channel according to the channel number information and a channel selection record, the channel selection record records the channel switching signal, another channel switching signal and a counter value, the counter value corresponds to the number of times that the image processing device receives the another channel switching signal after receiving the channel switch signal, and the frequency determining module determines the prediction results according to the candidate channel and the channel switching signal.

14. The image processing device according to claim 9, wherein the frequency determining module further determines a candidate frequency according to a frequency selection record that records the number of times that the frequency is selected, and determines the prediction results according to the candidate frequency and the channel switching signal.

15. The image processing device according to claim 14, wherein the frequency determining module determines a plurality of predicted channels according to a currently playing channel and determines the prediction results according to the predicted channels, and a priority of the frequency corresponding to the predicted channels is higher than that of the candidate frequency.

16. The image processing device according to claim 9, wherein the frequency determining module further selects the predicted frequencies such that the number of the selected predicted frequencies is not greater than the number of the tuners, and the tuners receive the image signal according to the selected predicted frequencies.

* * * * *